Aug. 1, 1961 J. W. BROUILLETTE, JR 2,994,779

IMAGE RECOGNITION METHOD AND SYSTEM

Filed June 17, 1960 5 Sheets-Sheet 1

INVENTOR:
JOSEPH W. BROUILLETTE, JR.

BY Richard V. Lang
HIS ATTORNEY.

IMAGE RECOGNITION METHOD AND SYSTEM

Filed June 17, 1960 5 Sheets-Sheet 2

INVENTOR:
JOSEPH W. BROUILLETTE, JR.
BY Richard V. Lang
HIS ATTORNEY.

Aug. 1, 1961 J. W. BROUILLETTE, JR 2,994,779

IMAGE RECOGNITION METHOD AND SYSTEM

Filed June 17, 1960 5 Sheets-Sheet 3

INVENTOR:
JOSEPH W. BROUILLETTE, JR.
BY Richard V. Lang
HIS ATTORNEY.

IMAGE RECOGNITION METHOD AND SYSTEM

Filed June 17, 1960 5 Sheets-Sheet 4

INVENTOR:
JOSEPH W. BROUILLETTE JR.,

BY Richard V. Lang
HIS ATTORNEY

IMAGE RECOGNITION METHOD AND SYSTEM

Filed June 17, 1960 5 Sheets-Sheet 5

INVENTOR:
JOSEPH W. BROUILLETTE JR.,
BY Richard V. Lang
HIS ATTORNEY.

United States Patent Office 2,994,779

Patented Aug. 1, 1961

2,994,779

IMAGE RECOGNITION METHOD AND SYSTEM

Joseph W. Brouillette, Jr., Jamesville, N.Y., assignor to General Electric Company, a corporation of New York Filed June 17, 1960, Ser. No. 36,850
16 Claims. (Cl. 250—200)

This invention relates to an image recognition method and system employing comparisons between invariant functions of a curve and a stored set of such invariant functions for a standard set of curves for recognizing substantial coincidence therebetween. More particularly, the invention relates to such a method and system employing means for recognizing such curves by an invariant which is a function of the phase relationship between the direction angle of the curve at separate points along the curve a given arc distance apart. The present application is a continuation-in-part of U.S. application, S.N. 679,512, now abandoned.

Prior image recognition systems rely in large on a correspondence directly between the stored memory and the curve to be recognized. Such a system requires at least the transformations of rotation, translation and magnification or de-magnification before a correspondence exists. Such transformations are time consuming and their elimination has been a problem long existing in the art.

This problem has been recognized by applicant and his co-workers and one solution has been offered in application Serial No. 618,606, filed October 26, 1956, by C. W. Johnson et al., and assigned to the assignee of the present invention. The system has been further implemented as described in application Serial No. 618,504, filed October 26, 1956, by J. W. Brouillette et al., and in application Serial No. 618,553, filed October 26, 1953, by C. W. Johnson, both of which are also assigned to the assignee of the present invention. Accordingly, it is an object of the present invention to provide an image recognition system which can recognize a curve independently of at least its magnification, translation or rotation.

Another object of this invention is to provide means for deriving a signal representative of an invariant function of a curve to be recognized.

A further object of this invention is to compare a signal representative of the direction angle of a curve to be recognized at points along the curve separated by a given increment of arc length, deriving the phase relationship at the two points or the angle between the direction angles to the curve at the two points.

A still further object of this invention is to provide methods whereby invariant functions may be derived for the recognition of continuous curves and such functions can be compared with a stored set of standard functions to perform the recognition process.

In carrying out the invention in one form thereof, delay means have been employed to delay a signal containing information as to the direction angle of a curve with respect to a fixed axis a given increment of time representative of a corresponding increment of arc length of the curve. Such a signal is generated while tracing out the curve in a continuous manner at a constant speed and the signal thus derived is compared with the delayed signal to arrive at the phase relationship therebetween which is representative of the change in phase of the direction angle with respect to the increment of arc traversed during the delayed time.

The novel features characteristic of the invention are set forth with particularity in the appended claims. The invention itself, however, together with further objects and advantages thereof, can best be understood by reference to the following description taken in connection with the accompanying drawings, in which—

Figure 1:
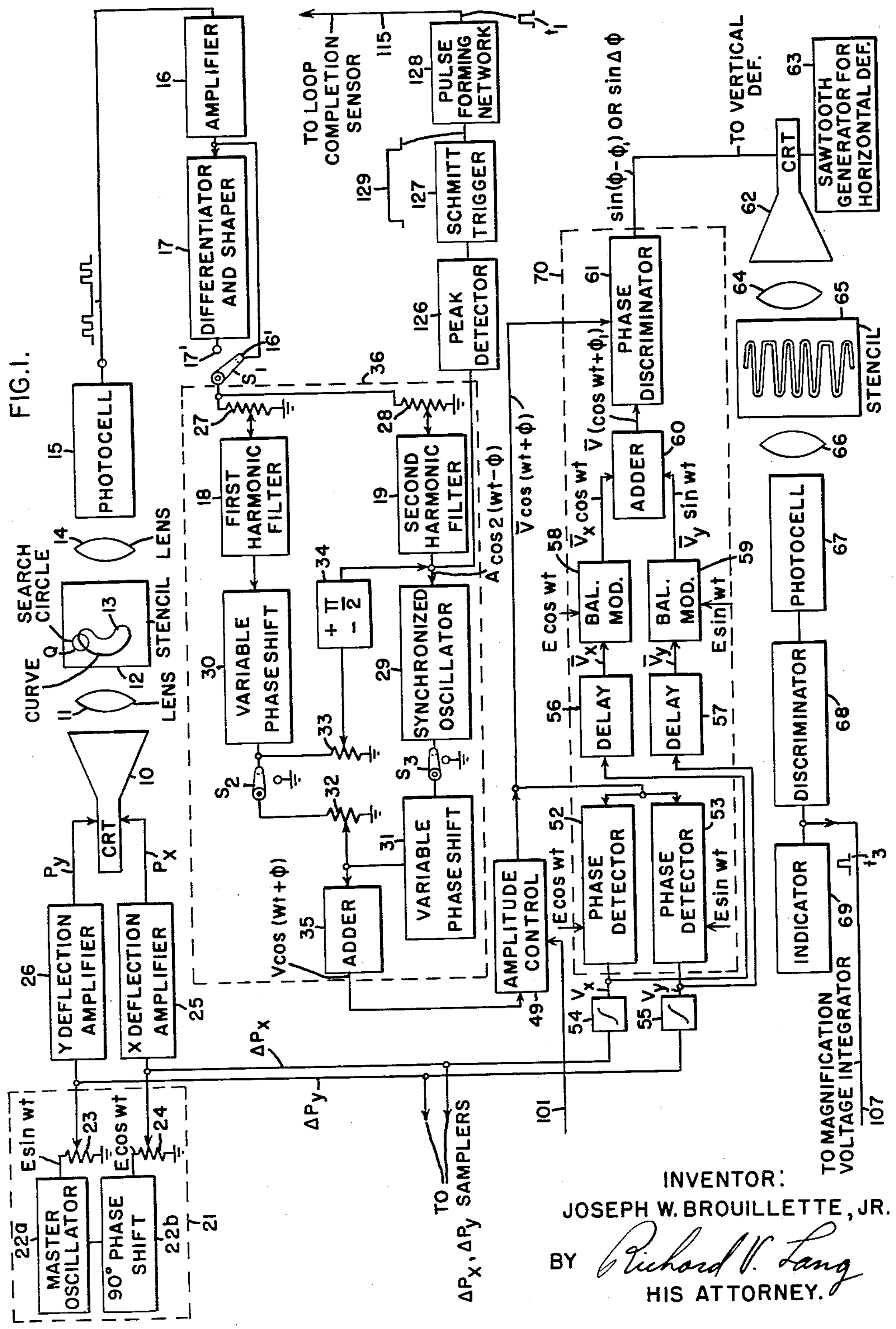
FIG. 1 is a block diagram of an entire system employing the invention.
Figures 3, 4:
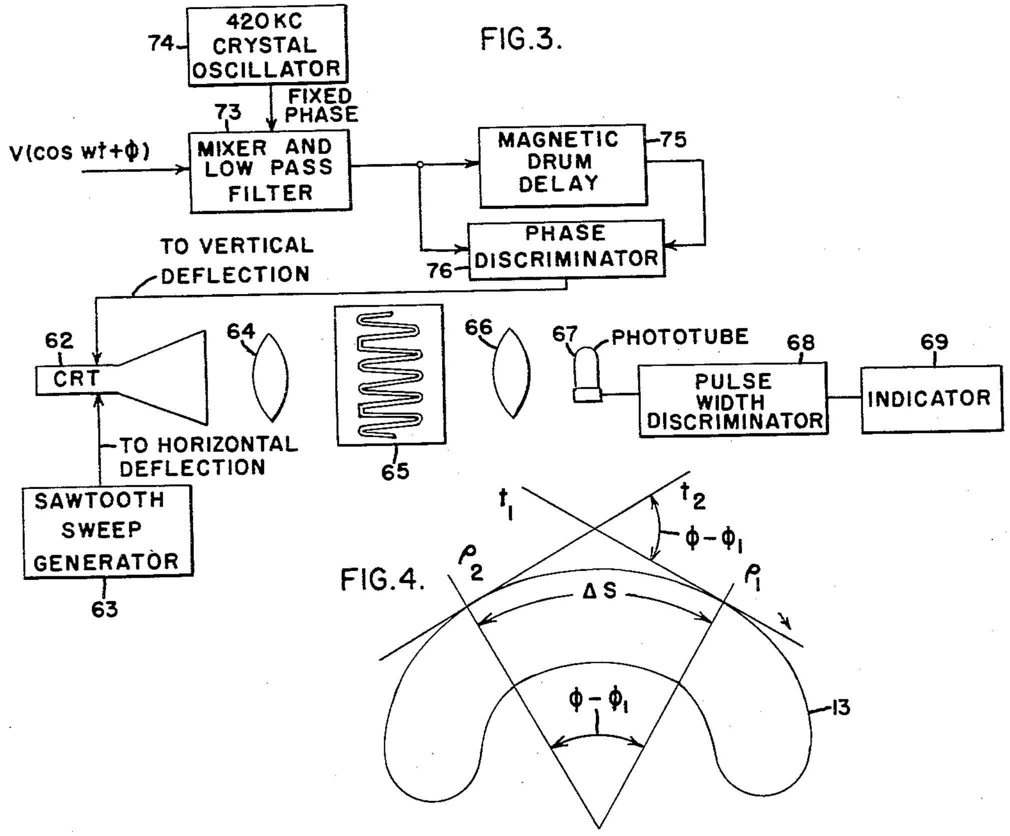
FIG. 3 is a block diagram employing a magnetic drum delay device in a sub-combination used to derive a signal representative of the phase difference between direction angles which may be employed in the combination of FIG. 1.
FIG. 4 is a diagram of a typical curve to be traced which contains a representation of the angles and curve segments discussed.
Figure 7:
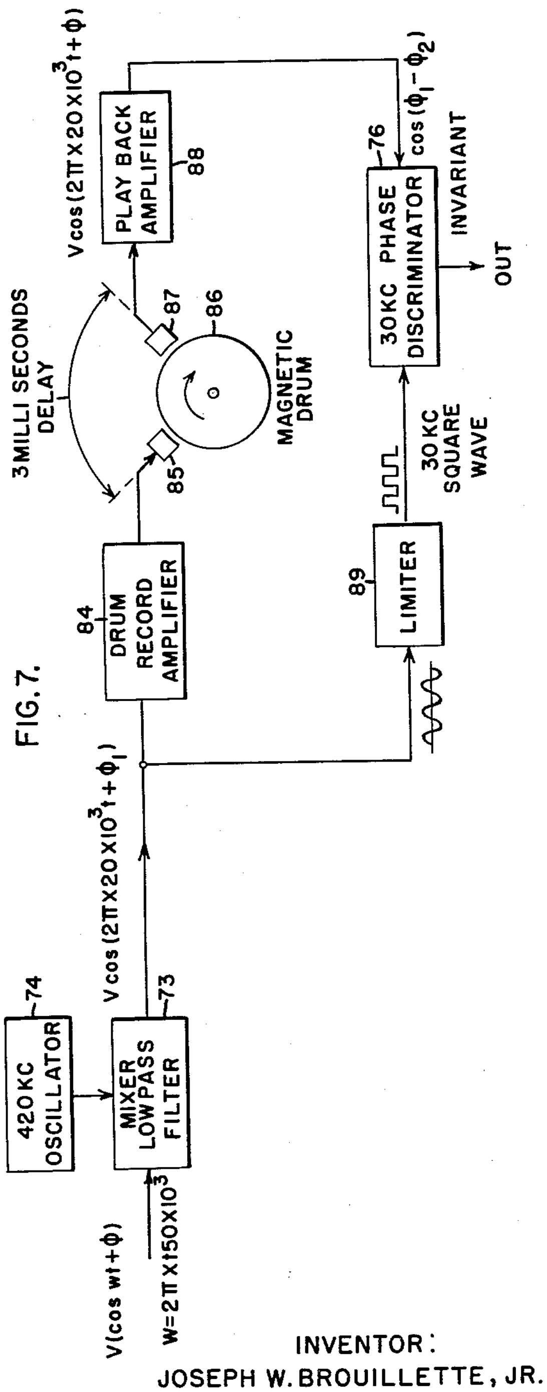
FIG. 7 is a more detailed representation of one embodiment of a magnetic drum delay suitable for application in the circuit of FIG. 3.
Figure 8:
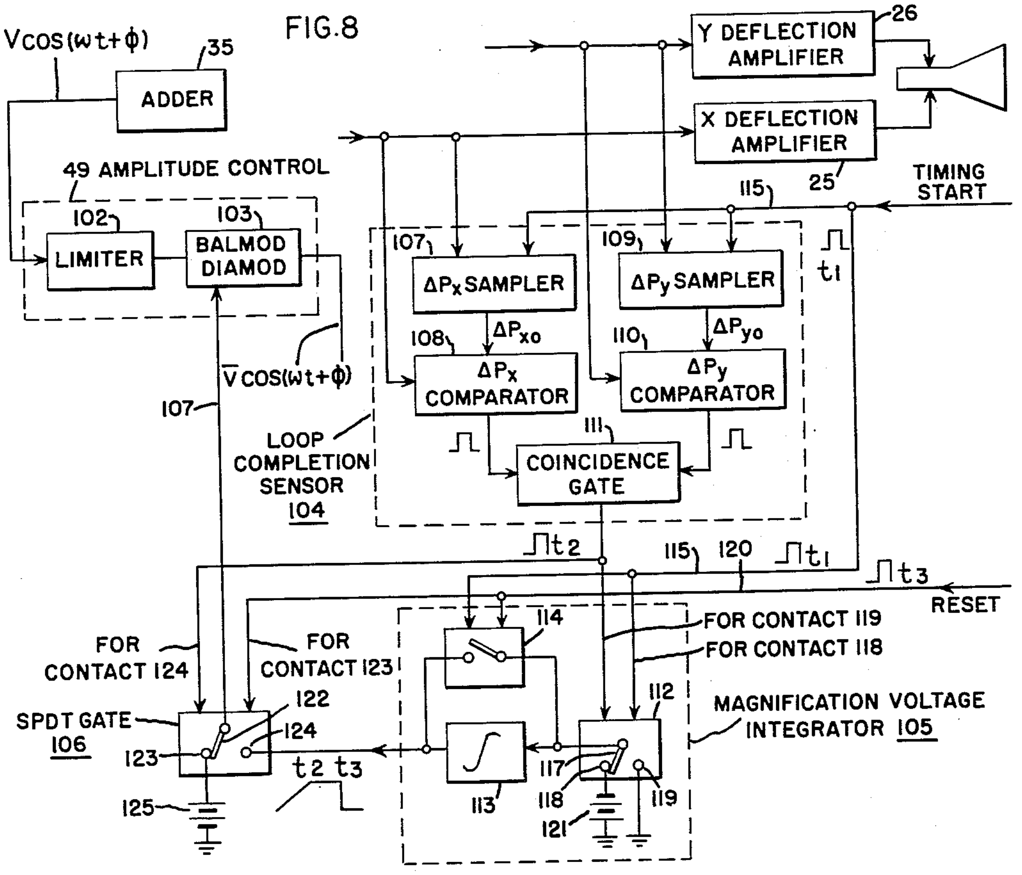
FIG. 8 is a more detailed block representation of the portion of the system of FIG. 1 which aids in achieving magnification invariance.
Figures 9A, 9B:
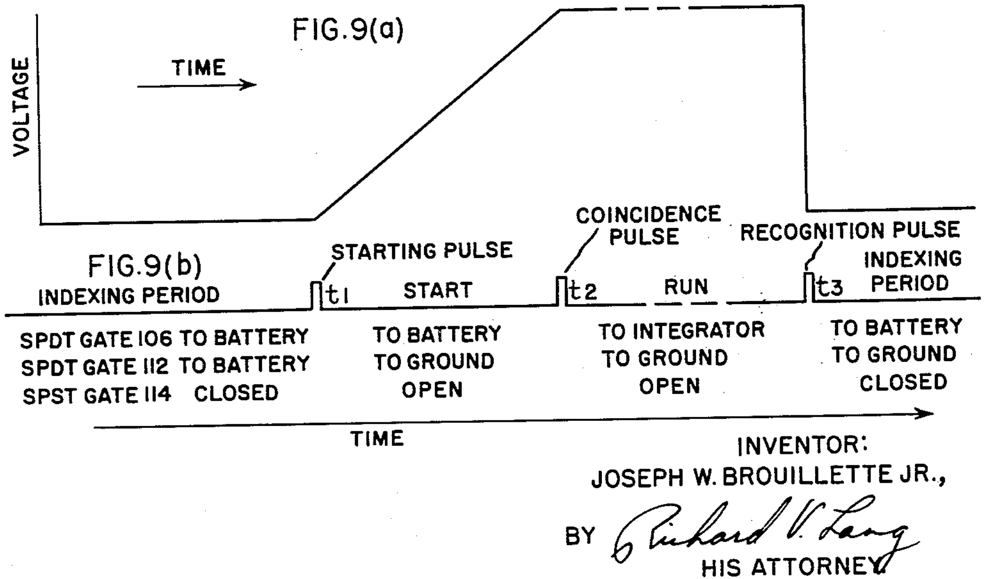
Figure 10:
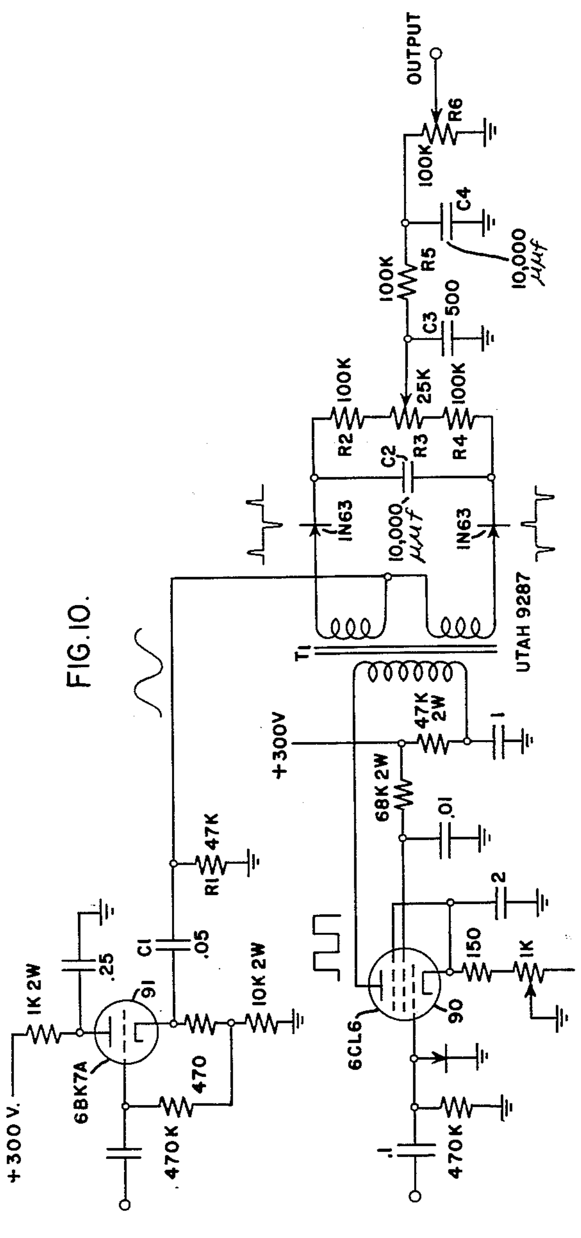
Figure 11:
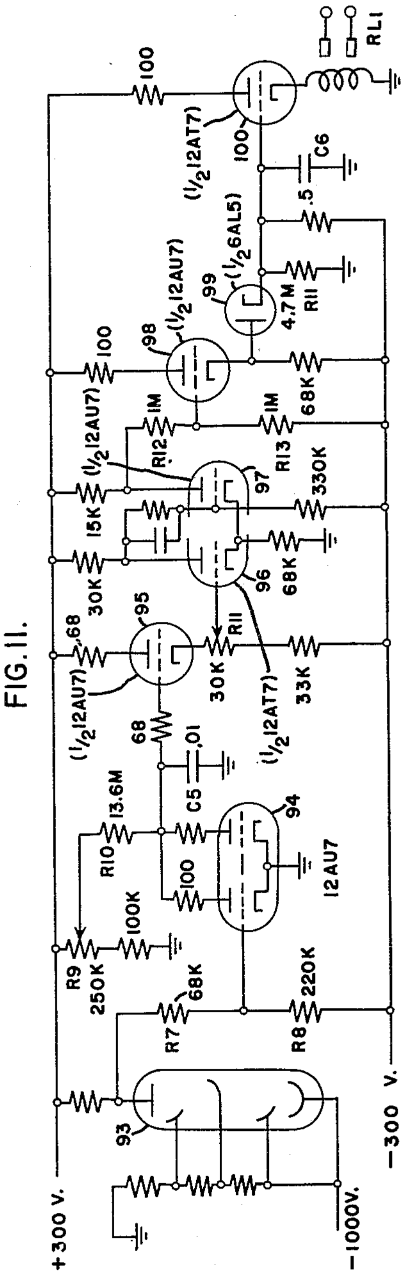

FIG. 9*a* is a plot of the output voltage waveform as a function of time applied to the amplitude control 49 for use in achieving magnification invariance; and FIG. 9*b* is a table indicating circuit conditions of the portion of the system illustrated in FIG. 8 as a function of time;

FIG. 10 is a detailed representation of one embodiment of a phase discriminator suitable for application in the circuits of FIGS. 3 and 7; and FIG. 11 is a detailed illustration of one embodiment of a photocell pickup circuit suitable for application in the recognizer portion of the circuits of FIGS. 1 and 3.

It is understood, of course, that the values shown on the detailed circuitry are solely illustrative of one embodiment of the invention which has been constructed in order to facilitate the practice of the invention and to conserve the effort necessary by those skilled in the art in doing so. These values are in no way intended to limit the invention thereto but are merely given by way of example, the true scope of the invention being defined by the appended claims.

Turning now to the drawings, in FIG. 1 an image recognition system is illustrated which embodies a portion of the system disclosed in the previously mentioned application Serial No. 618,553 as well as the invention herein disclosed. Identical numerals have been used on elements of this figure which correpsond to FIG. 1 of application Serial No. 618,553 to simplify recognizing the correspondence therebetween and to facilitate use of the description found therein of the overall system.

In FIG. 1, display tube 10 is equipped with any convenient deflection system which imparts vertical and horizontal components of motion to the electron beam in the tube in accordance with voltages applied to the deflection system. The deflection of the electron beam, of course, controls the position of the spot of light seen on the face of the tube when the electron beam strikes the phosphor screen thereof. The deflection system may, for example, be of the electrostatic type having horizontal and vertical deflection plates. It is convenient for the purposes of this specification to consider the horizontal deflection voltage as representative of the value of the $x$ coordinate and the vertical deflection voltage as representative of the $y$ coordinate of the spot S on the screen in a right-handed orthogonal Cartesian coordinate system having its center or origin at the center of the cathode ray tube 10 and having its axis oriented along the two deflection axes. The position on the screen of the spot of light at any instant may then be represented by a position vector P having an $x$ component, $p_x$ and a $y$ component, $p_y$. Such a representation logically assumes that the deflection system of the tube 10 is linear in the relation between applied voltage and amount of deflection. In fact, this linearity is not necessary in all applications of the device, but the explanation of the system is clarified by making this assumption for the present. A full explanation of the vector representation employed can be found in the above-mentioned application Serial No. 618,553.

The spot on the face of the tube 10 is focused by means of a lens 11 on stencil 12 containing a curve 13. The stencil 12 may be transparent or translucent in which case the light is collected by a lens 14. If stencil 12 is opaque and reflecting, curve 13 may conveniently be its only non-reflecting portion in which case lens 14 should be positioned on the same side of the stencil 12 as lens 11 and offset therefrom in order to collect reflected light. The light from lens 14 is detected by photocell 15 which generates a signal each time the spot crosses curve 13. This signal is amplified by amplifier 16 and either fed through a differentiator and shaper 17, or directly, to potential dividers 27 and 28 selectively by means of switch $S_1$ having contact 16′ for direct connection and contact 17′ for connection through differentiator and shaper 17. Potential divider 27 has its output connected to the input of a first harmonic filter 18 and potential divider 28 has its output connected to a second harmonic filter 19.

These first and second harmonics are first and second harmonics of the frequency of a search circle generator 21 which comprises a master oscillator 22a which is preferably a crystal controlled oscillator used for generating a stable alternating output of the form $E \sin wt$ which is applied through potentiometer 23 to $y$ deflection amplifier 26 of tube 10. The signal from the master oscillator is shifted ninety degrees in phase by the network 22b to derive a signal of the form $E \cos wt$ which is applied through potentiometer 24 to $x$ deflection amplifier 25.

The output of first harmonic filter 18 is fed through a variable phase shift network 30 to a selectable phase shift network 34 capable of shifting the phase of the signal plus or minus $\pi/2$ radians. The output of second harmonic filter 19 and variable phase shift network 34 are fed to a synchronized oscillator 29 more completely described as FIG. 12 of the above-mentioned application Serial No. 618,553. The output of synchronized oscillator 29 is fed to variable phase shift network 31. The outputs of variable phase shift network 31, and network 30 through potentiometer 32, are fed to an adder 35. This portion of the network from the potential dividers 27 and 28 through adder 35, as blocked out by dashed line 36, may be considered to constitute a velocity voltage generator which will generate a signal of the form $V \cos (wt+\phi)$ where V is the magnitude of the velocity vector of spot S as it moves along the curve, $w$ is $2\pi$ times the frequency of master oscillator 22a and $\phi$ is the phase of the velocity vector with respect to the $x$ axis, as described in application Serial No. 618,553.

The output of adder 35 is fed through amplitude control 49 to a pair of phase discriminators 52 and 53. The cosine of the fundamental frequency of master oscillator 22a is fed to phase discriminator 53. The outputs of phase discriminators 52 and 53 are integrated respectively by integrators 54 and 55, the output of integrator 54 being fed to the $x$ amplifier 25 and the output of integrator 55 being fed to the $y$ amplifier 26 of the tube 10.

A thorough explanation of the operation of this portion of the system may be found by referring to the above-mentioned application Serial No. 618,553. The portion of this part of the system of special interest here is that the output of adder 35 is a vector voltage $V \cos (wt+\phi)$ where $\phi$ is the phase angle or direction angle of the curve 13 with respect to the $x$ axis of tube 10, as stated above.

As explained in application Serial No. 618,553, the output of the phase discriminators 52 and 53 consists of the orthogonal components $V_x$ and $V_y$ of the velocity vector output of adder 35 respectively. The output of phase discriminator 52, $V_x$, is fed to an audio delay line 56, the output of which is $V_x$, which will hereinafter be used as the symbol for the delayed velocity. Correspondingly, the output of phase discriminator 53, $V_y$, is fed through audio delay line 57, the output of which is $V_y$. The next two elements in the system are balanced modulators 58 and 59. These balanced modulators operate similarly to the balanced modulators disclosed in the above-mentioned application Serial No. 618,504 so that when the input $V_x$ is fed to balanced modulator 58 in conjunction with a signal representative of the cos $wt$ of the frequency of master oscillator 22a, the output is $V_x \cos wt$. Similarly, the output of balanced modulator 59 when fed with $V_y$ and the sine of the frequency of master oscillator 22a is $V_y \sin wt$. The outputs of balanced modulators 58 and 59 are added in adder 60 the output of which is $V \cos (wt-\phi_1)$ where $\phi_1$ represents the direction angle of the curve 13 delayed by the time represented by delays 56 and 57.

The output of adder 60 is fed to a phase discriminator 61 where it is compared with the output of amplitude control 49 which is $V \cos (wt+\phi)$ to detect the phase difference between the signals. The output of phase discriminator 61 is therefore $\sin (\phi-\phi_1)$ or $\sin \Delta\phi$, where $\Delta\phi$ is the increment of the change of direction angle of the curve 13 over the delayed time presented by the delay lines 56 and 57. This output is fed to the vertical deflection plates of a second display device 62 which has a linear sweep applied to its horizontal deflection plates by a saw-tooth generator 63. The pattern displayed on the face of tube 62 is thus representative of the invariant quantity of the curve 13 related to the change in direction angle over a constant increment of arc since the curve follower traces along curve 13 at a constant speed along the arc. The image on the face of tube 62 is focused by means of a lens 64 onto a stencil 65 which may be any one of a set of stencils representative of the particular invariant function derived for a set of stored standard curves.

The waveform on stencil 65 may be made broad enough so that, in the event that the image on tube 62 substantially corresponds to that of the waveform, a preselected amount of light will be collected by a lens 66 and focused on photocell 67. The output of photocell 67 is fed to a discriminator 68 and thence to an indicator 69 which will give an indication when the stencil 65 and the picture on the tube 62 are in substantial correspondence. The portion of the system blocked out by dashed line 70 is thus seen to derive the invariant function $\sin \Delta\phi$ of curve 13.

Figure 2:
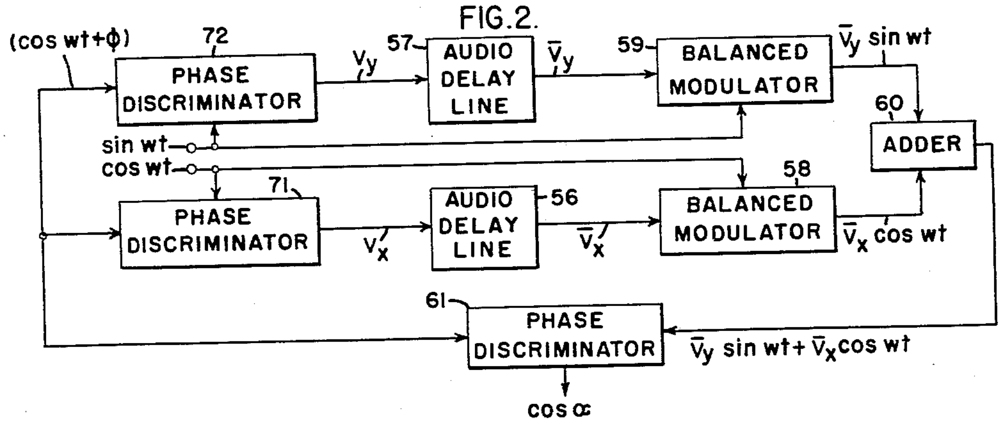
FIG. 2 is a block diagram of a portion of the system rection angles from the signal representative of the direc- of FIG. 1 which derives the phase difference of the di- tion angles with respect to a fixed axis.

The diagram of FIG. 2 illustrates the sub-combination of the circuit of FIG. 1 which is used for delaying the velocity signal representative of the direction angle of curve 13 and comparing it with the instantaneous value thereof. This figure shows the signal $V \cos (wt+\phi)$, derived from amplitude control 49, fed to phase discriminators 71 and 72 which also have cos $wt$ and sin $wt$ fed to them respectively. The outputs of discriminators 71 and 72 are fed through audio delay lines 56 and 57 respectively to balanced modulators 58 and 59. The cosine and sine of $wt$ are also fed respectively to balanced modulators 58 and 59. The output of modulators 58 and 59 are added in adder 60 and fed to phase discriminator 61. This signal, which is here shown to be $\bar{V}_y \sin wt+\bar{V}_x \cos wt$ which is equivalent to the signal $\bar{V} \cos (wt+\phi)$, is fed to phase discriminator 61 for comparison, and discriminator 61 has an output represented by $\cos \alpha$ where $\alpha$ is the angle between the direction angles of the curve at the instantaneous point and the point prior to delay. The circuit of FIG. 2 could be connected directly to amplitude control 49 using separate phase discriminators. In FIG. 1 the function of the phase discriminators 71 and 72 was performed by phase discriminators 52 and 53 which are performing a dual function in FIG. 1.

FIG. 3 illustrates an alternative method of obtaining delay prior to comparing the direction angles. Here again, the input $V \cos (wt+\phi)$ to mixer and low pass filter 73 is obtained from the amplitude control 49 of FIG. 1. A crystal oscillator 74 is shown as a second input to mixer and low pass filter 73. As disclosed in application Serial No. 618,553, the fundamental frequency of the master oscillator 22a of FIG. 1 selected was 450 kilocycles. The frequency of crystal oscillator 74 is 420 kilocycles of a fixed phase. The input signals from oscillator 74 and amplitude control 49 are beat in mixer and low pass filter 73 to derive a 30 kilocycle beat frequency containing the phase information of the signal $\overline{V} \cos (wt+\phi)$. This is done in order to reduce the frequency of the output of the mixer and low pass filter 73. The filter portion of this network 73 selects only the 30 kilocycle signal and feeds it to a magnetic drum delay device 75 to provide a given delay representative of a given arc length along curve 13, again since the spot traces around the curve 13 with a uniform speed along the arc. The delayed signal from drum delay 75 is fed to phase discriminator 76 as one input, the other input being the 30 kilocycle signal of the output of mixer and low pass filter 73. Phase discriminator 76 compares these signals and provides an output containing information as to the angle between the direction angles to the curve before the delay time and the instantaneous value.

As in FIG. 1, this signal is fed to the vertical deflection plates of a cathode ray tube 62 which has horizontal deflection plates driven by saw-tooth sweep generator 63. The invariant function representing the change or variation in the direction angle of the curve is again presented on the face of cathode ray tube 62 and focused by lens 64 on stencil 65 in order to detect substantial correspondence. Any light passing through stencil 65 is focused by lens 66 on photocell 67. The output of photocell 67 is fed through pulse width discriminator 68 to an indicator 69 for indicating substantial correspondence between the curves.

Both of the circuits of FIGS. 2 and 3 illustrate subcombinations providing a method of obtaining a high frequency delay using low frequency delay elements. In the event that the magnetic drum delay device 75 has a frequency response sufficient to handle the frequency of the output of amplitude control 49, mixer and low pass filters 73 and crystal oscillator 74 may be eliminated from the circuit of FIG. 3.

Figure 5:
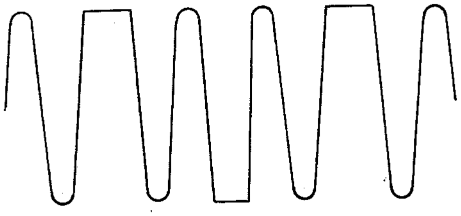
FIG. 5 is a representation of the invariant waveform derived by employing the apparatus of the invention to trace out the curve of FIG. 4.

Referring to FIG. 4, there is illustrated the curve 13 showing the angular and arc relationships. In FIG. 4 two points on curve 13, $p_1$ and $p_2$, are shown. $T_1$ and $T_2$ are the tangents to the curve at these points and define the direction angles of the curve at these points respectively. The angle $(\phi-\phi_1)$ illustrated is the angle between these tangents, or the angle between the direction angles, illustrating the amount the direction angle has changed while traversing the curve from point $p_2$ to point $p_1$ in the direction of the arrow at $p_1$. It can be seen from geometrical considerations that the angle $(\phi-\phi_1)$ is also equal to the angle of the normals at points $p_1$ and $p_2$ FIG. 5 is a representation of the invariant waveform output from the circuit of FIG. 1 when tracing around the curve of FIG. 4. The curve of FIG. 4 has been placed on the stencil 12 of the circuit of FIG. 1 in various positions and substantially the same output shown in FIG. 5 has occurred in all instances.

The construction of the system of FIG. 1 and the sub-combinations of FIGS. 2 and 3 are as outlined in the above-referenced patent applications with the exceptions of the audio delay line circuitry of FIG. 2, the magnetic drum delay line circuitry of FIG. 3 and the recognition circuitry shown connected as the output of phase discriminator 76 in FIG. 3. This circuitry is not a part of any of these applications. Typical circuitry for these portions of the system will be described with the understanding that there is no intention on the part of applicant to limit himself to any single operational embodiment, and that the values given on the circuit diagrams are only intended to be descriptive of one operational embodiment which has been constructed, in order to further implement the teaching of applicant's invention, the true scope of which is covered by the appended claims.

Figure 6:
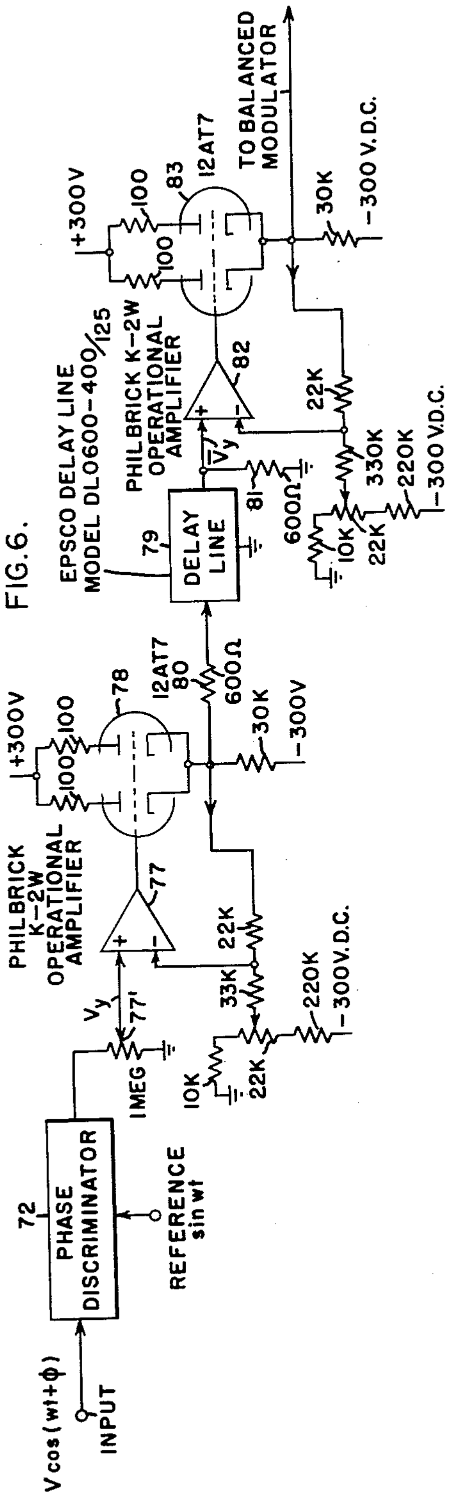
FIG. 6 is a detailed representation of one embodiment of a delay line suitable for application in either the $x$ or $y$ channel of the circuit of FIG. 2.

Turning now to FIG. 6, one delay line portion of the system of FIG. 2 is illustrated. It will be understood, of course, that the operation of both of the delay line portions of FIG. 2 is similar. In FIG. 6 there is illustrated the phase discriminator 72 of FIG. 2 having an input $V \cos (wt+\phi)$ and a reference input $\sin wt$, and developing an output $V_y$, the $y$ component of velocity. This is applied through a potentiometer 77' to an operational amplifier 77 having a negative feedback loop. The specific operational amplifier used was a "Philbrick K2W amplifier." The output of amplifier 77 supplies a cathode follower 78 employing a 12AT7 twin triode. The negative feedback loop of operational amplifier 77 is taken around the cathode follower 78 as illustrated. Operated in this manner the circuit behaves as an amplifier with unity gain and an output impedance of about 1 ohm. The output of cathode follower 78 is supplied to a delay line 79, which in the embodiment illustrated is an "Epsco Delay Line," model FL0600–400/125, through a resistor 80 which matches the characteristic impedance of the delay line 79. The output of delay line 79 is applied across a resistor 81 as a terminating load. Thus, there are no reflections due to termination mismatch.

The voltage across resistor 81 is applied to a second operational amplifier 82, similar to amplifier 77. Since the input impedance of the amplifier 82 is practically infinite, the line termination is not disturbed. Amplifier 82 has its output connected to a second cathode follower 83, which is similar to cathode follower 78, and amplifier 82 again has a feedback loop from cathode follower 83 here shown to be identical to that of amplifier 77. The output signal of cathode follower 83 is at an impedance level of 1 ohm and represents the delayed signal $\overline{V}_y$. As stated before, the $x$ channel is identical and typical phase discriminators and balanced modulators have been previously described in the above-referenced patent applications.

Turning now to FIG. 7, where the drum system of the circuit of FIG. 3 is illustrated in more detail, the input is shown to be $V \cos (wt+\phi)$ to mixer and low pass filter 73 which is also fed, as previously described, from a crystal oscillator 74 to provide an output beat frequency at 30 kc. This output is fed to a drum record amplifier 84 and thence to the recording head 85 of magnetic drum 86 which rotates in the direction of the arrow at a speed sufficient to provide a three millisecond delay between record head 85 and pickup head 87. Head 87 is connected to a playback amplifier 88 whose output is provided as an input to phase discriminator 76. In addition, the output of mixer and low pass filter 73 is fed through a limiter 89 to produce a square wave whose zero crossings are the same as those of the output of mixer and low pass filter 73. It can be shown that if this square wave is resolved by Fourier analysis the fundamental is the same as that of the output of mixer and low pass filter 73 except for an arbitrary amplitude. A square wave is desirable here in order to provide a sharper pulse at the zero crossing.

The portion of the system by which recognition is achieved independently of curve magnification is illustrated in FIGURES 1 and 8. This portion achieves size invariance by making the spatial separation on the curve $(\Delta S)$ of the voltage vectors used to derive the invariant quantity a fixed fraction of the total length (S) of the curve. In other words, if the total arc length of the reference curve is 10 units, and the arcuate separation between voltage vectors used in deriving the reference curve is 2 units, then in an unknown curve having an arc length of 5 units, the arcuate separation between voltage vectors would be made equal to 1 unit. Intuitively, one can see that this adjustment of $\Delta S$ (in the curve under study) to be a fixed fraction of total arc length S (of the curve under study) will normalize the time required to trace the curve so that the quantities calculated will be invariant. The quantities calculated are then directly comparable with the stored invariants because of this normalization.

The apparatus in FIGURES 1 and 8 performs this magnification normalizing function in the following manner. An initial tracing of the curve is made at a known fixed rate to determie the total arc length (S). After the total arc length (S) is determined, the rate of curve tracing is adjusted such that during the time delay between compared vectors, the curve follower will transit the preassigned fraction of total arc length. One could of course adjust the time delay to be a shorter or longer interval, and retain the tracing rate constant; or one could adjust both the time delay and the tracing rate. The earliest method is often simpler in that achievement of a variable time delay is of greater practical difficulty than a variable sweep rate, and is the method herein disclosed.

Normalizing the invariant against magnification is effected by the amplitude control 49, illustrated in FIGURE 1, governed in turn by a control voltage applied from bus 101. An adjustment of the amplitude control 49 controls the rate at which the curve follower traces out the curve in a manner to be explained shortly. The derivation of the magnification normalizing control voltage on bus 101 is by means of apparatus shown associated with 49 and illustrated in FIGURE 8.

The manner in which the tracing rate is affected by the adjustment of amplitude control 49 (as well as its construction) was first disclosed in the said co-pending application, S.N. 618,553 and much of the following description was first described therein. The automatic gain control device 49 should preferably be a clipper type of circuit rather than the type which actually or literally varies the gain of an amplifier by a feed back signal since it has often been found that the clipper type of circuit will not affect the phase modulation of the signal whereas a slight error may be introduced by a feedback controlled variation in gain. Alternatively, element 49 may include a clipper followed by a balanced modulator of the type described in detail in the above noted co-pending application, S.N. 618,504. This type of balanced modulator is a modification of the so-called "Diamod" circuit described in FIG. 118 at page 398 of volume 19, "Waveforms" of the Massachusetts Institute of Technology Radiation Laboratory Series, McGraw-Hill, New York, 1949. The "Diamond" should, however, be modified by tuning its input transformer to the fundamental first harmonic frequency of master oscillator 22*a*.

Such a balanced modulator 103 together with a preceding double clipping limiter 102 form the principal components of the amplitude control 49 as illustrated in FIGURE 8. The adder 35 of FIGURE 1 is connected to the input of the limiter 102 for supplying the wave $V \cos(wt+\phi)$ thereto. The limiter clips both halves of the input wave, filters out the harmonics generated in the clipping operation thus standardizing the amplitude, and feeds it to the A.C. input of the balanced modulator 103. The bus 101 supplies the magnitude normalizing control voltage ($\overline{V}$) to the D.C. input of the balanced modulator 103. The balanced modulator is a circuit producing an A.-C. output the frequency and phase of which are equal to the frequency and phase of its A.-C. input and the amplitude of which is equal to its D.-C. input. The output waveform may thus be represented as $\overline{V}\cos(wt+\phi)$. When such a circuit is used, best results have been obtained by using a toroidal ferrite core transformer and exercising particular care in accurately locating the center tap thereof.

The amplitude control circuit 49 permits one to control the linear speed of motion of the center of the search circle in response to a D.-C. voltage. It should also be noted that if the D.-C. input to the balanced modulator goes negative, a 180° phase shift is produced in the output thus affording an additional control over the direction of motion, clockwise or counter-clockwise, of the center of the search circle. It will be recalled that a positive $\pi/2$ phase shift by element 34 will result in clockwise or counter-clockwise rotation depending upon which side of the curve 13 the search circle initially approaches from. Since a change in polarity of the D.-C. input to a balanced modulator type of amplitude control 49 reverses the direction of motion, it permits one to achieve either clockwise or counter-clockwise motion regardless of which initial approach direction the system is using.

The output of amplitude controlling circuit 49, which will be the signal $\overline{V}\cos(wt+\phi)$, having the quantity $\overline{V}$ determined in a manner yet to be explained, is then applied to a pair of phase discriminators 52 and 53 (as seen in FIGURE 1). Each of these phase discriminators may, for example, comprise a circuit which is fully disclosed and claimed in the above-noted co-pending application, S.N. 618,504. Considered as a "black-box" the phase detector may be said to be a circuit having two A.-C. input voltages of the same frequency, one being called a signal voltage and the other being called a carrier voltage, and further producing a D.-C. output voltage which is equal to the amplitude of the signal voltage times a sinusoidal function of the angle of phase difference between the two A.C. input voltages. As used in the present system the velocity voltage output signal $\overline{V}\cos(wt+\phi)$ of amplitude controlling circuit 49 is the input signal voltage to each of phase detectors 52 and 53. Carrier input voltages for phase detectors 52 and 53 are the voltages $E \cos wt$ and $E \sin wt$ derived from circle generator 21. In the operation of the circuit the instantaneous amplitude of the signal input voltage is sampled once each cycle at a time determined by the maximum value of the carrier voltage, which in this case is derived from the master oscillator or circle generator. Where the input signal to the phase detector is a cosine wave and the carrier signal on the back-to-back sampling diodes of the circuit as disclosed in the above noted co-pending application is also a cosine wave, the D.-C. output is equal in magnitude, and throughout all quadrants has the correct polarity of the cosine of the angle of phase difference between the two A.-C. inputs. Similarly where the input signal is a cosine wave and the carrier is a sine wave, the D.-C. output is proportional to the sine of the angle of phase difference throughout all four quadrants. Any circuit having these properties may be used for phase detectors 52 and 53. As noted above, however, one specific example of such a circuit is disclosed and claimed in the co-pending Brouillete-Johnson application. The specific details of this circuit do not form a part of the present invention.

From the above stated properties of the phase detector circuits 52 and 53 it is apparent that their D.-C. outputs will represent the $x$ and $y$ components of the velocity vector $\overline{V}$ where this vector is resolved in the set of axes determined by the search circle. These axes, it will be recalled, always remain parallel to the $x$ and $y$ orthogonal axes of tube 10. These output voltages are therefore labeled in FIG. 1 as $v_x$ and $v_y$, and it is apparent that these voltages are also equal to $dx/ds$ and $dy/ds$ when the center of the search circle is moving at constant speed. Here, of course, $x$ and $y$ are the coordinates of a point traversing curve 13 at constant speed and the derivatives indicated are the rates of change of these coordinates with respect to arc lengths along curve 13. These voltages are inherently functions of time, but since it is well known that speed equals arc length or distance divided by time it follows that when the center of the search circle moves at constant speed these voltages become proportional functions of arc length.

In the system of FIG. 1 the voltages $v_x$ and $v_y$ are respectively applied to integrators 54 and 55. These integrators are preferably operational amplifiers of the type commonly used in analog computers. In general they comprise high gain D.-C. amplifiers having a resistive input impedance element and a capacitive feedback impedance element.

The outputs of integrators 54 and 55 are incremental position voltages $\Delta p_x$ and $\Delta p_y$, respectively, which are applied to the $x$ and $y$ deflection amplifiers 25 and 26 and which cause the center of the search circle to move as these voltages vary.

The derivation of the magnification normalizing control voltage supplied on bus 101 is achieved by the loop completion sensor 104, whose function is to determine when the curve tracer has made one complete sweep of the curve, and the magnification voltage integrator 105, whose function is to perform an integration of a predetermined voltage for the time interval measured by 104, and thus produce a control voltage proportional to this time interval. A pulse controlled single pole-double throw gate 106 is further employed for selectively supplying either an arbitrary reference voltage or the magnification normalizing control voltage to bus 101. A more detailed treatment of these components and their operation will now be undertaken, with principal reference being made to FIGURE 8.

The loop completion sensor 104 is associated with the curve follower and detects when a complete circuit or loop about the curve under study has been accomplished. It comprises as its principal components $\Delta p_x$ sampler 107, $\Delta p_x$ comparator 108, $\Delta p_y$ sampler 109, $\Delta p_y$ comparator 110, and a coincidence gate 111. The $\Delta p_x$ sampler 107 is electrically connected to the input of the deflection amplifier 25 and feeds to the $\Delta p_x$ comparator 108 a voltage quantity which we shall denominate $p_{x0}$. The $\Delta p_x$ sampler 107 is adjusted to take a sample at a time set by a timing pulse $t1$ supplied on the timing bus 115.

The timing pulse $t1$ is arranged to occur at or shortly after initiation of the curve tracing operation at a time which is largely a matter of choice. When the curve follower is tracing a curve, the output of photocell 15 contains a large number of pulses, each denoting the crossing of the curve under study by the search circle. The presence of these pulses may then be used to give an indication of the tracing operation by the curve follower. A preferred place to sense this operation is at the output of the second harmonic filter 19. As illustrated in FIGURE 1, a peak detector 126, a Schmitt trigger 127, and a pulse forming network 128 are provided, serially connected to one another, and to the output of filter 19 for deriving the timing pulse $t1$. The timing pulse bus 115 is thus connected to the output of network 128.

The output of the second harmonic filter 19 is a harmonic voltage of essentially sinusoidal waveform of twice the frequency of the search circle, which voltage is derived from the pulses appearing as a result of the tracing operation. This harmonic voltage is then fed to a peak detector 126 which produces a D.C. output voltage when the harmonic voltage is present. The D.C. output of the peak detector is then supplied to the Schmitt trigger 127 which provides, after the peak detector output has exceeded an arbitrary threshold, a step waveform 129 whose elevated portion continues so long as an input exceeding the threshold is provided. The step waveform is then fed to the pulse forming network 128 which may include a differentiator and diode. The differentiator portion of the network 128 provides pulses of opposite polarity at the leading and trailing edges of the Schmitt trigger output pulse 129, and the diode is provided to select only the pulse corresponding to the leading edge. This pulse, with or without further delay, is the timing pulse $t1$.

The $\Delta p_x$ sampler may take the form of a gate under the control of the timing pulse $t1$ which charges a storage capacitor to the voltage $\Delta p_{x0}$. In order to minimize current drain on the integrator (54), the storage capacitor may be provided with an isolating cathode follower circuit. The $\Delta p_y$ sampler 109 is coupled to the input of the $y$ deflection amplifier 26 and is arranged to supply and output voltage $\Delta p_{y0}$ to the $\Delta p_y$ comparator 110 at the time set by the voltage applied on the timing bus 115. The $\Delta p_y$ sampler and $\Delta p_x$ sampler may be of identical construction and should operate at the same time under control of bus 115. The $\Delta p_x$ comparator 108 is provided with two comparison inputs to one of which the sample quantity $\Delta p_{x0}$ from the $\Delta p_x$ sampler 107 is applied and to the other of which the instantaneous voltage being supplied to the $x$ deflection amplifier 25 is applied. The $\Delta p_x$ comparator 108 has the function of providing at its output a short pulse whenever the two input quantities are of equal value and may be of conventional form. The $\Delta p_y$ comparator 110 is of similar design and similarly connected, having one comparator input $\Delta p_{y0}$ coupled to the output of the $\Delta p_y$ sampler 109 for applying the quantity $\Delta p_{y0}$ thereto, and its other input coupled to the input of the $y$ deflection amplifier 26 for applying the instantaneous values of quantity $\Delta p_y$. The comparator 110 produces at its output a pulse indicating coincidence in amplitude between the voltages applied to its separate inputs and indicates such coincidence by a short pulse. The $\Delta p_x$ comparator 108 and the $\Delta p_y$ comparator 110 have their output pulses supplied respectively to the input terminals of a coincidence gate 111. This gate determines merely the coincidence of pulses at its two inputs and produces an output pulse $t2$ in bus 116 when pulses are simultaneously applied. The coincidence gate is a typical logic element and is generally insensitive to small variations in pulse amplitude.

Considering the operation of the loop completion sensor 104 as a whole, it may be seen that the occurrence of the timing pulse $t1$ on bus 115 causes the $\Delta p_x$ and $\Delta p_y$ samplers, which are continuously fed with $\Delta p_x$ and $\Delta p_y$ deflection voltages, to take a deflection voltage sample. These deflection voltage samples denominated respectively $\Delta p_{x0}$ and $\Delta p_{y0}$ are then stored in the samplers until the stored value and the instantaneous values of the deflection voltages are of equal value. This equivalence in both coordinates is detected by elements 108, 110 and 111, and is an indication that the curve is now complete and that the curve follower has returned to the originally selected initial coordinates. It should be apparent that this method of sensing loop completion would generally apply to simply connected figures and to multi-ply connected figures provided that initial coordinates do not lie on a crossover. This also presupposes that means are provided for causing the deflection voltages to make a continuous circuit around multi-ply connected figures. When coincidence is detected the pulse $t2$ is generated on the bus 116, and fed to the SPDT gate 106 and the magnification voltage integrator 105.

The magnification voltage integrator 105 has the function of providing a voltage whose magnitude is proportional to the time interval required for completion of a loop by the curve follower. It may include as its principal components an operational amplifier, having an input capacitor and a feedback resistor all included in block 113 directed by an integral sign, a reset gate 114, and an input control gate 112. The magnification voltage integrator 105 produces a linearly rising voltage waveform followed by a constant value which presets for a period and falls to zero as illustrated in FIGURE 9*a*. The point of initial rise corresponds to the occurrence of timing pulse $t1$ and the point at which the constant value commences is set by the timing pulse $t2$.

The integrator input control gate 112 is a single pole-double throw gate having two pulse operated control inputs. The single pole 117 is connected to the input of integrator 113. It is selectively switched to terminals 118 and 119. One control input, which is connected to bus 115, causes the pole electrode 117 to contact the terminal electrode 118. Similarly, the other control input, which is connected to bus 116, connects the pole 117 to the terminal 119. The terminal 118 is connected to a positive source 121 of direct potential. The terminal 119 is grounded directly. The integrator input control gate 112 switches the input of integrator 113 to the source D.-C. potential 118 under the influence of applied pulse *t1* and switches the integrator 113 input to ground of a pulse applied on bus 116.

The integrator reset gate 114 is a single pole-single throw pulse operated gate connected between the input and the output of the integrator 113. The reset gate 114 is provided by separate control inputs. One control input arranged to open the switch is connected to bus 115 supplying pulse *t1* and the other control input arranged to close the gate is connected to bus 120 supplying a pulse *t3*. The bus 120 is preferably connected to the output of the discriminator 68 (of FIGURE 1) so that upon the occurrence of recognition, a pulse *t3* derived from the recognition signal is supplied to the bus 120. Closure of the reset gate resets the integrator 113 to zero. Opening of the reset gate 114 enables the integrator 113 to start the integration of any input voltages supplied through integrator control gate 112.

The magnification voltage integrator 105 functions in the following manner outlined in table 9*b* to produce the waveform illustrated in FIGURE 9*a*. Upon the occurrence of the pulse *t1*, the reset gate 114 is opened permitting the integration of any voltage supplied to the integrator 113. At the same time *t1*, the integrated input control gate 112 is operated to couple to the input of the integrator 113 the fixed voltage supplied by the source 121. Starting at time *t1*, accordingly, a rising wave is produced at the output of the integrator 113. The magnitude of the output wave continues to rise in linear fashion until the occurrence of the pulse *t2*. At time *t2* the integration control gate 112 switches the integrator input to zero ground potential. This prevents any further rise in integrator output, but allows the output to hold this maximum value during the remainder of the recognition period. Termination of the recognition period is signalled by the occurrence of the pulse *t3* of the bus 120, which returns the integrator output to zero voltage.

Thus it may be seen that throughout the period from *t2* to *t3* a voltage is available at the output of the magnification voltage integrator 105 whose magnitude is proportional to the time required for the curve follower to complete one loop of the curve under study. The single pole-double throw gate serves to couple this voltage at desired times to the amplitude control 49. The single pole-double throw gate has a pole 122 connected to the bus 101 and thence to amplitude control 49 and two terminals 123 and 124 respectively. The terminal 123 is connected to a source of negative reference potential 125. The terminal 124 is connected to the output of the magnification voltage integrator 105. The single pole-double throw gate 106 is operated by two control inputs. The control input connecting pole 122 to the source 123 is connected to the bus 120 for operation by pulse *t3*. The gate control input connecting the pole 122 to the terminal 124 is connected to bus 116 for operation by pulse *t2*.

It may thus be seen that upon the occurrence of the pulse *t3* that the single pole-double throw gate 106 connects the bus 101 to a predetermined voltage 25. This predetermined voltage is adjusted to cause the curve to be traced at a convenient rate. Upon occurrence of a pulse *t2*, the gate is switched so that the bus 101 is now connected to the terminal 124 and thus to the voltage derived at the integrator 105. This connection then causes the curve follower to trace the curve at a rate which is proportional to the voltage derived at the magnification voltage integrator 105, and is thus proportional to the total arc length.

The over all operation of the magnification normalizing network may now be summarized with continuing reference to FIGURES 9*a* and 9*b*. FIGURE 9*a* indicates the output voltage of the magnification voltage integrator 105 plotted against time whereas FIGURE 9*b* is a table indicating the conditions of the gates 106, 112 and 114 in relation to time and in particular in relation to the timing pulses *t1*, *t2* and *t3*.

Prior to the occurrence of the starting time pulse *t1*, let us assume that the curve follower and the associated circuitry are in operation. Prior to *t1*, accordingly, the loop completion sensor 104 is quiescent. The magnification voltage integrator 105 is also quiescent; having the integrator control gate 112 grounding the input of the integrator 113 and the reset gate 114 shorting the output of the integrator 113 through the integrator control gate to ground. The single pole-double throw gate 106, on the other hand, couples the source 125 to amplitude control 49 for causing the curve follower to trace at the desired initial rate. The foregoing period may be described as the indexing period.

The indexing period is terminated and the second period is initiated upon the occurrence of the starting pulse *t1*. The second period of operation will be denominated the starting period. In this period the loop completion sensor 104 and the magnification voltage integrator 105 are started simultaneously. The starting of the magnification voltage integrator 105 (as explained above) is achieved by connecting the input of the integrator 113 to the D.C. source 121 by means of the integrator control gate 112, and by opening the reset gate 114. The single pole-double throw gate 106, however, remains in the same condition as before, so as to cause the curve follower to trace around the curve under study at a standard rate. The magnification normalizing voltage is being computed during the starting period.

The starting period is terminated and the run period initiated when the loop completion sensor 104 determines that a loop has been completed and produces the coincidence pulse *t2*. The coincidence pulse *t2* switches the integrator 113 input to ground, thus stopping further integration and at the same time switches the single pole-double throw gate 106 to a position whereby the integrator output voltage is fed directly to the input bus 101 of the amplitude control 49. During the run period, the magnification normalizing voltage is used, and the invariant is being computed.

The running period is terminated upon the occurrence of recognition from which the recognition pulse *t3* is derived. Pulse *t3* returns the system to the condition described in the indexing period.

Turning now to FIG. 10 where the phase discriminator 76 of FIGS. 3 and 7 is described in more detail, the square wave output of limiter 89 of FIG. 7 is applied to the signal grid of a pentode amplifier 90 which is a 6CL6 as illustrated. The anode load of amplifier 90 is the primary of a pulse transformer *t1*. The pulse transformer *t1* serves to differentiate the square wave and to produce a series of pulses, both positive and negative, across the center-tapped secondary of pulse transformer *t1*. Two diodes (1N63) are connected as shown so that the current flows in the same direction through both.

The delayed signal from playback amplifier 88 of FIG. 7 is impressed on the grid of triode amplifier 91 of FIG. 8 which serves as a cathode follower amplifier whose output is supplied through $C_1R_1$ to the center tap of the secondary of pulse transformer *t1*. This serves as a source of low impedance for this signal.

At the instant when the pulse from amplifier 90 makes the diodes conduct, a conductive path is established from the tap on the secondary of pulse transfer $t1$ to the resistor $R_2$, $R_3$ and $R_4$ and condenser $C_2$. The charging current in $C_2$, due to the pulses, charges $C_2$ almost to the peak value of the pulses. The time constant of $C_2$ and $R_2$, $R_3$ and $R_4$ is made sufficiently great so that this voltage does not decay appreciably between pulses. Thus, the diodes are cut off except at the instant the pulses are applied. The transformer $t1$, the diodes, $C_2$, $R_2$, $R_3$ and $R_4$ serve as a switch which only closes momentarily at the time the square wave has a positive going zero crossing. The tap on $R_3$ then has applied to it the voltage appearing at $R_1$ at the sampling instant. Condenser $C_3$ charges through this path. It discharges through $R_5$ and $R_6$ slowly, so that it has an average voltage on it proportional to the sampled voltage at $R_1$. This is smoothed by the filter consisting of $R_5$, $C_4$. The net result is that there is an average voltage appearing at output terminal 92 proportional to cos $(\phi_1-\phi_2)$. The magnitudes of the various resistors and capacitors shown in FIGS. 6, 8 and 9 are as illustrated on the diagram for the single specific embodiment illustrated, where they are given in ohms, microfarads and watts unless otherwise designated.

Turning now to FIG. 10, the recognizer portion of FIG. 3 is illustrated in detail. In FIG. 3 the horizontal plates of tube 62 has supplied thereto a sawtooth from sawtooth sweep generator 63 of a period approximately equal to the time the follower takes to follow around the curve 13.

As mentioned above, the period of the sweep generator 63 is made approximately equal to the time the follower takes to follow around the curve 13. These periods are chosen not precisely equal so that there will be a "slipping" along the horizontal or time axis of the visual display of the invariant waveform. The effect of this slipping along the time axis, it may be seen, is to simulate rotation of the curve under study, and assuming that the invariants otherwise agree, bringing about a coincidence after a short period. The amount of slipping per frame is adjusted so that it is less than the width of the lines of the stencil 65. With other methods of recognition, the adjustment of the slipping rate will be similarly adjusted. Thus the waveform is displayed as a luminous pattern on cathode ray tube 62. The face of the tube is imaged on the stencil 65 by a lens 64. As the spot traces out the waveform, if the wave matches the stencil 65, the photocell 67 will be illuminated. If the waveform does not match the stencil there will only be short pulses when the spot crosses the stencil. The photocell portion of the circuit, and the recognition circuitry, is illustrated in FIG. 11, where a photocell 93 is coupled to a twin triode 94 by resistors $R_7$ and $R_8$. If the photocell 93 is not illuminated no current flows in its anode load resistor. Hence, the anode potential is high. When the cathode is illuminated the anode potential is reduced by the voltage drop in the resistor. In the non-conducting condition the voltage drop on the grid of tube 94 is such that a large current flows and the anode potential is small. When the photo tube is conducting the triode 93 is biased off and the condenser $C_5$ starts to charge through $R_9$ and $R_{10}$. The condenser voltage on $C_5$ rises in an approximately linear manner. The potential on $C_5$ is applied as a signal to tube 95 which is a cathode follower amplifier employing one half of a 12AU7 as indicated. The output D.C. level of cathode follower 95 can be adjusted by the tap on $R_{11}$.

Tubes 96 and 97 form a conventional Schmitt trigger circuit. This circuit has the property that the output voltage is one fixed value when the input is below a critical value and the output is at a second higher fixed value when the input is above the critical value. Hence, if the photocell 93 remains illuminated sufficiently long, condenser $C_5$ charges up until its voltage rises above the critical value. The Schmitt trigger then fires and its output voltage rises abruptly. The Schmitt trigger output is coupled through $R_{12}$ and $R_{13}$ to the grid of tube 98, another cathode follower. This tube drives a diode 99 whose output is coupled through $R_{14}$ and $R_{15}$ to the grid of tube 100. The bias on tube 100 is arranged so that, for the non-conducting case, tube 100 is cut off. If the Schmitt trigger circuit fires, tube 100 is allowed to conduct and relay $R_{11}$ is actuated to provide a recognition signal. In FIG. 11 the values of the resistors and the capacitors again have the values indicated on the drawing which are in ohms or microfarads.

While the principles of the invention have now been made clear in the illustrative embodiments, there will be immediately obvious to those skilled in the art many modifications in structure, arrangement, proportions, elements, components used in the practice of the invention and otherwise which are particularly adapted for specific environments in operating requirements without departing from these principles. The appended claims are therefore intended to cover and embrace any such modifications within the limits only of the true spirit and scope of the invention.

What I claim as new and desire to secure by Letters Patent of the United States is:

1. Apparatus for deriving an invariant function representing the change in the instantaneous direction of a curve as represented by the angle between the tangents to the curve at preselected short intervals along the curve, comprising means for; generating an electron beam, means for focusing the beam to a spot on a search surface, means for displaying a curve to be followed on the search surface, means for deflecting the beam so as to move the spot in a small search circle at a predetermined constant frequency, means for deriving a voltage pulse each time the spot crosses the curve, means for generating a carrier voltage having a frequency equal to the predetermined frequency of rotation of said spot, means for modulating the frequency of said carrier voltage by varying its phase in response to variations in the time occurrence of said voltage pulses, means for causing the search circle to trace out the curve at constant speed along its arcs, means for delaying a portion of the carrier voltage a time which is a fixed fraction of the total time required to trace around the curve and means for comparing the phases of the carrier and the delayed portion to derive the phase relation therebetween representative of the angle between the tangents at two points on the curve corresponding respectively to where the search circle is at the moment and to where it was at an earlier moment, earlier by the amount of delay.

2. Apparatus for deriving an invariant function representing the change in the instantaneous direction of a curve as represented by the angle between the tangents to the curve at preselected short intervals along the curve, comprising means for; generating a signal having a phase representative of the direction of the tangent to a point on the curve with respect to a fixed axis, means for moving said point along the curve at a constant speed to generate at subsequent points thereon similar signals having a phase representative of the direction of the tangent with respect to said fixed axis at said subsequent points, means for delaying a portion of the signal representative of the direction a time which is a fixed fraction of the total time required to trace around the curve, and means for comparing the phases of the generated and delayed signals to derive the phase relation therebetween.

3. Apparatus set forth in claim 2 having in addition thereto control means for causing said means for moving said point at constant speed to trace at a predetermined rate for a first period and at a second calculated rate for a second period, means for sensing when said curve has been traced once around said curve during said first period, said calculated rate having a value such that the ratio between the time delay and the time for loop completion is fixed for magnification normalization.

4. Apparatus set forth in claim 3 wherein said rate of curve tracing during said second period is adjusted to satisfy said ratio relationship.

5. A form recognition system comprising curve display means, an electron beam device for producing a scanning spot on a search surface, and means to deflect said beam and said spot; means placing said curve display means and said search surface in reciprocally imaged relationship; means to apply first and second sinusoidal voltages to said deflection means, said first and second sinusoidal voltages each having the same frequency and respectively having amplitudes and phase angles such that said deflection means causes said spot to move in a search circle the diameter of which is small by comparison to the length of said curve on said search surface; means coacting with said electron beam device and said curve display means to derive at least one signal voltage containing information determined by the relationship between said curve and said circle; an oscillator tuned to the frequency of said first and second sinusoidal voltages; means to apply said signal voltage to control the phase of the output of said oscillator; means for using said search circle to trace around said curve at a constant speed, means to delay a portion of the output of said oscillator a time which is a fixed fraction of time required to trace once around the curve; phase comparison means to compare the output of said oscillator with said delayed portion for deriving the phase relationship therebetween representative of the angle between the tangents of the points on the arc of the curve separated by a distance equal to that traced during said time delay; a second curve display means having orthogonal sets of deflecting means; means for applying the output of said phase comparison means to one set of said deflecting means in said second curve display means; means for applying a sawtooth signal to the other set of said deflecting means in said second curve display means; an optical recognition system including a stencil containing a wave form representative of a similarly derived phase comparison for a stored standard curve; and a phototube pickup and indicator for indicating substantial correspondence between the waveform displayed on said second display means and said stencil.

6. A system as set forth in claim 5 wherein the period of said sawtooth signal and the time for loop completion are slightly different so as to cause the signal applied to said second curve display means to move in a direction to cause a search in rotation of the original curve display means.

7. An electronic curve follower comprising curve display means, an electron beam device for producing a scanning spot on a search surface, and means to deflect said beam and said spot; means placing said curve display means and said search surface in reciprocally imaged relationship; means to apply first and second sinusoidal voltages to said deflection means, said first and second sinusoidal voltages each having the same frequency and respectively having amplitudes and phase angles such that said deflection means causes said spot to move in a search circle the diameter of which is small by comparison to the length of said curve on said search surface; means co-acting with said electron beam device and said curve display means to derive first and second signal voltages, said first signal voltage having a frequency equal to the frequency of said first and second sinusoidal voltages, said second signal voltage having a frequency twice the frequency of said first and second sinusoidal voltages; an oscillator tuned to the frequency of said first and second sinusoidal voltages; means to apply at least said second signal voltage to control the phase of said oscillator; means to add said first signal voltage to the output of said oscillator to form a voltage which is an analog representation of a velocity to be imparted to the center of said search circle; means to adjust the velocity voltage such that the curve is traced around once in a fixed total time, means to delay said velocity voltage a time which is a fixed fraction of the total time equal required to trace around the curve, means to compare said velocity voltage with said delayed velocity voltage to derive the phase relationship therebetween; means to compare the waveform of the signal representing said phase relationship with a set of waveforms of stored signals representing correspondingly derived phase relations for standard curves; means for recognizing substantial correspondence between the signal representative of said phase relationship with said standard waveforms; means to integrate said velocity voltage; and means to apply the output of said integrating means to said deflection means to move the center of said search circle along said curve.

8. Electronic curve generating apparatus comprising a master oscillator, a second oscillator tuned to the fundamental or first harmonic frequency of said master oscillator; means to derive a control signal in the form of a series of voltage pulses, the positions of said pulses within a sequence of intervals of time being a measure of the direction angle of said curve to be generated, each interval being equal to the period of said master oscillator; means to vary the phase of said second oscillator in accordance with the variations of the position of said pulses within said time intervals; means to trace around said curve at a constant rate, means to delay the output of said second oscillator a fixed time corresponding to an increment of arc length which is a fixed fraction of the total length of said curve; means to compare the output of said second oscillator with said delayed output to derive the phase relation therebetween representative of the change of said direction angle; means to compare the signal representative of said phase relationship with a set of stored signals containing corresponding information for a set of standard curves; and means for indicating substantial correspondence between said compared signals.

9. A curve recognition system comprising means for deriving a signal representative of the direction angle of a curve with respect to a reference axis at successive points along the curve by tracing along the curve in a continuous manner, means for deriving a second signal representative of the direction angle of the curve with respect to said reference axis at points respectively spaced apart from said successive points a fixed distance along said curve, means for comparing said first and second signals to derive a signal representative of the difference in direction angles at said spaced points, means for comparing said derived signal with a stored signal for achieving recognition.

10. A system as set forth in claim 9 wherein said tracing rate is of constant speed and said second signal is derived from said first signal by time delay means.

11. A system as set forth in claim 9 wherein means are provided for calculating the total length of the curve, and wherein said spacing is made a fixed fraction of the total length of the curve.

12. In a curve following system, the combination comprising means for deriving a signal whose phase is representative of the direction angle of a curve with respect to a reference axis at successive points along the curve by tracing along the curve at a constant rate, means for delaying said signal a fixed time corresponding to an increment of arc which is a fixed fraction of the total length of said curve, means for comparing said signal with said delayed signal to derive the phase relation therebetween, means for comparing said phase relation with a stored set of similar relations for standard curves, and means for recognizing substantial correspondence between said phase relation and any of said stored set of relations.

13. In a curve following system, the combination comprising means for deriving a signal whose phase is representative of the direction angle of a curve with respect to a reference axis at successive points along the curve by tracing along the curve at a constant speed, means for delaying said signal a fixed time which is a fixed fraction of the total time required to trace around the curve, means for comparing said signal and said delayed signal in order to derive the phase relation therebetween, means for comparing the phase relation between the signals representative of the direction angles of said curve at pairs of points spaced apart at fixed intervals along the arc of said curve with a stored set of similar relations for standard curves, and means for recognizing substantial correspondence between said phase relation and any of said stored set of relations.

14. The apparatus of claim 13 in which said means for delaying comprises a magnetic drum delay device.

15. The apparatus of claim 13 in which said means for delaying comprises a fixed frequency crystal oscillator having a frequency close to that of said signal, means for beating the output of said oscillator and said signal to produce a low difference frequency which contains the phase information of said signal, low pass filter means for separating out said difference frequency, and a magnetic drum delay device for delaying said difference frequency.

16. The system of claim 13 in which said means for delaying comprises a pair of phase discriminators, means for feeding said signal to said phase discriminators, means for feeding the sine of the frequency of said signal to one of said phase discriminators and the cosine of the fundamental frequency of said signal to the other of said phase discriminators whereby the output of said discriminators represents orthogonal components of said signal, two audio delay lines, means for feeding the output of one phase discriminator to one delay line, means for feeding the output of the other of said phase discriminators to the other delay line, whereby the delay lines derive outputs representative of the delayed magnitudes of said orthogonal components of said signal, a pair of balanced modulators, means for feeding the output of said one delay line to one of said balanced modulators, means for feeding the output of said other delay line to the other of said balanced modulators, means for feeding the sine of the frequency of said signal to said one balanced modulator, means for feeding the cosine of the frequency of said signal to said other balanced modulator, and means for combining the output of said balance modulators for providing a re-combined output representative of said signal delayed.

No references cited.